Aug. 18, 1925.
C. E. KEMP
CUP AND HANDLE THEREFOR
Filed June 23, 1921
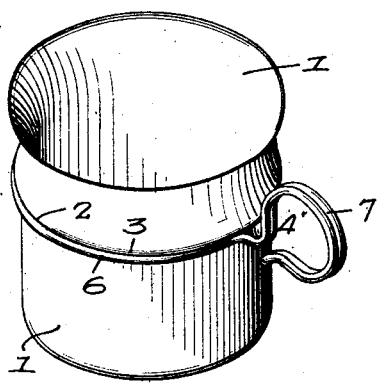
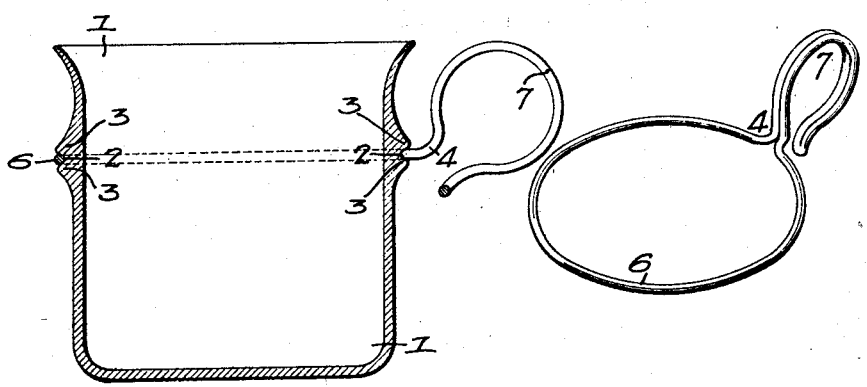
Inventor-
Charles E. Kemp.
by his Attorneys Patented Aug. 18, 1925.

1,550,618

UNITED STATES PATENT OFFICE.

CHARLES EUGENE KEMP, OF WILLIAMSPORT, PENNSYLVANIA.

CUP AND HANDLE THEREFOR.

Application filed June 23, 1921. Serial No. 479,826.

*To all whom it may concern:*

Be it known that I, CHARLES E. KEMP, a citizen of the United States, residing in Williamsport, Pennsylvania, have invented certain Improvements in Cups and Handles Therefor, of which the following is a specification.

One object of my invention is to make a cup without a handle and to provide means whereby a metallic handle can be secured to the cup.

A further object of the invention is to construct the cup and handle so that the cup will not have to be discarded if cracked.

In the accompanying drawing:

Fig. 1 is a perspective view of my improved cup, showing the handle attached thereto;

Fig. 2 is an enlarged sectional view of the cup and handle; and

Fig. 3 is a detached perspective view of the handle.

Referring to the drawing, 1 is a cup of china, porcelain, or other suitable material. The cup may be of any shape and size desired, but must be provided with an annular groove 2 on the outside some distance from the upper edge. The material of the cup is preferably reinforced, as at 3, and the groove is formed in this reinforced portion. The groove preferably extends around the cup, as shown in Fig. 1.

4 is the handle made of spring, preferably steel. This handle is made from a ring bent into shape to form an encircling portion 6, which fits snugly in the groove 2 of the cup, and handle portions 7, bent to form a suitable hand hold. This construction allows for the ready expansion of the encircling portion 6, when applied to the cup, or when removed therefrom. The handle may be nickel plated, or ornamented in any manner desired.

It will be seen from the above construction that the cup can be made to fit a particular form of handle and that the handle is arranged to fit in the groove formed in the cup.

When cups are made of china, or porcelain, the body of the cup remains intact after the handle is broken. Under ordinary circumstances, this renders the cup useless and it is discarded. In restaurants and lunch rooms, where cups are used in large numbers the percentage of breakage is proportionately large entailing a loss that is obviated by the use of my improved cup and handle. The cracking of a cup does not render it worthless, if made in accordance with my invention, the life of the cup being thus considerably lengthened by means of the detachable handle with its encircling portion.

While my invention is especially applicable for use in connection with cups, it can be used for other receptacles made of fragile material.

I claim:

The combination of a cup having an annular groove therein; and a detachable handle for said cup made of a continuous ring of resilient wire, shaped to form an encircling portion and a hand hold, said encircling portion being located in the groove of the cup and extending entirely around the cup, the hand hold consisting of two parallel sections of wire bent at right angles to the encircling portion, and acting as a spring tending to contract the encircling portion with a force to retain it in the groove of the cup under conditions of use and allowing the encircling portion to be enlarged to remove the handle from the cup or to apply the handle to the cup.

CHARLES EUGENE KEMP.